ary Examiner—James A. Patten

United States Patent [19]
Meyer

[11] 3,910,990
[45] Oct. 7, 1975

[54] LIQUID, CARBOXYL-TERMINATED POLYMERS

[75] Inventor: James Melvin Meyer, Hockessin, Del.

[73] Assignee: E. I. Du Pont de Nemours and Company, Wilmington, Del.

[22] Filed: Oct. 31, 1973

[21] Appl. No.: 411,430

[52] U.S. Cl............ 260/478; 260/483; 260/484 R; 260/535 P; 260/537 R; 260/537 P; 260/830 R
[51] Int. Cl.$^2$ ................. C07C 55/00; C07C 55/22; C07C 69/34
[58] Field of Search ........... 260/478, 533 D, 537 P, 260/526 R

[56] References Cited
UNITED STATES PATENTS

| | | | |
|---|---|---|---|
| 3,346,631 | 10/1967 | Boyer et al. | 260/533 |
| 3,417,020 | 12/1968 | Preuss et al. | 252/52 |
| 3,427,351 | 2/1969 | Nakagawa et al. | 260/537 |
| 3,746,756 | 7/1953 | Mains et al. | 260/533 |

Primary Examiner—James A. Patten

[57] ABSTRACT

Copolymers of ethylene with α-olefins having up to 20 carbon atoms are dissolved in an ozone-resistant solvent and contacted with ozone. The resulting compositions are low molecular weight, liquid polymers that have carboxyl groups attached to a substantially saturated hydrocarbon backbone. The ozonization products, as well as their derivatives, usually have functionalities of about 1.8–3.0 and are, therefore, useful starting materials for the preparation of high molecular weight polymers, such as, for example, polyesters and polyamides, which find numerous industrial applications.

13 Claims, No Drawings

LIQUID, CARBOXYL-TERMINATED POLYMERS

BACKGROUND OF THE INVENTION

This invention relates to a process for making liquid polymeric materials terminated by carboxylic groups attached to a substantially saturated hydrocarbon backbone and to the liquid polymeric materials made by said process.

U.S. Pat. No. 3,472,826 (to Potts et al.) describes certain random copolymers of ethylene and α-olefins, various functional groups being attached to the terminal carbon atoms. Carboxylic groups may, for example, be introduced by copolymerizing ethylene with another α-olefin in the presence of a rather large amount of azobisisobutyronitrile. This results in the introduction of cyano groups into the molecule. These groups can then be hydrolyzed to carboxyl groups.

U.S. Pat. No. 3,629,172 (to Jones) discloses polymeric materials having reactive end groups, such as hydroxyl or carboxyl groups. While at least about 40 percent of the chain units originally contain vinylene radicals, about 70 percent of the unsaturation is removed by hydrogenation.

U.S. Pat. No. 3,634,383 (to Miller) mentions a prior art process of subjecting butyl rubber to ozonolysis, this technique resulting in difunctional compounds. This process is said to suffer from numerous disadvantages.

Carboxylated polymethylene polymers are described in U.S. Pat No. 3,250,754 (to Stewart). These compositions can be prepared by ozonizing chain-saturated hydrocarbon or halohydrocarbon polymers containing side-chain carbon-carbon double bonds and oxidizing the resulting ozonides.

U.S. Pat. No. 3,687,905 (to Dorer) teaches degradation of ethylene/propylene copolymers to lower molecular weight materials containing carboxyl, ester, and aldehyde groups by heating the copolymer in the presence of air and oxygen above 100°C.

U.S. Pat. No. 3,049,523 (to Roussel) discloses ozonolysis of chloroprene to polymeric products terminated at one end of carboxylic groups and the other end by acid chloride groups. This reference is not concerned with ozonization of saturated polymers.

While one of the above processes starts with a substantially saturated polymer, it does not suggest degradation by ozonization. Most other processes employ ozonolysis; either an unsaturated rubber is subjected to ozonolysis, the double bonds being the reactive sites, or the functional groups are introduced in the polymerization process via functional monomers.

Low molecular weight, functionally substituted liquid polymeric materials would be valuable, for example, as components of adhesive compositions or prepolymers in the formation of such polymers as polyamides, polyurethanes, or polyesters. Preferably, they should be inexpensive, being made from readily available starting materials by a simple process.

SUMMARY OF THE INVENTION

There is now provided a process for making low molecular weight polymeric compositions containing an average of about 1.8–3.0 carboxylic groups attached to a substantially saturated hydrocarbon backbone.

According to this process, a copolymer of ethylene and of at least one α-olefin $R$-$CH_2$-$CH$=$CH_2$, where R is hydrogen or a $C_1$-$C_{17}$ alkyl, is dissolved in an ozoneresistant solvent and ozonized for about 1–30 hours at a temperature of about 15°–50°C., giving a liquid, cleaved and carboxylated product having a number-average molecular weight of about 750–7,000, preferably 750–5,000.

For the purposes of the present disclosure, the term "a copolymer of ethylene and of at least one α-olefin $R$-$CH_2$-$CH$=$CH_2$" also includes copolymers which contain a minor proportion of side unsaturation, for example, EPDM copolymers.

This invention also includes within its scope the liquid carboxylated polymeric materials made by the above process.

DETAILED DESCRIPTION OF THE INVENTION

The starting ethylene/α-olefin copolymers can be in some cases obtained commercially, e.g., EPM rubber; others can be made by known methods using various coordination catalysts of the type disclosed, for example, in U.S. Pat. Nos. 2,962,451; 3,000,867, 3,113,115; 3,154,528; 3,166,517; 3,171,824; 3,291,780; and 3,558,521. The method of making such copolymers is well known in the industry as the Ziegler process. The preferred α-olefin comonomers have 3–12 carbon atoms (R is hydrogen or a $C_1$-$C_9$ alkyl), the most preferred α-olefins having 3–6 carbon atoms (R is hydrogen or a $C_1$-$C_3$ alkyl). Especially preferred starting copolymers are ethylene/propylene and ethylene/α-butylene copolymers.

When an ethylene/propylene copolymer is used as the starting material, it is necessary for sufficient solubility that the copolymer contain at least about 25 weight percent of propylene. The proportion of propylene may be as high as about 80 weight percent, although usually it will be no higher than about 55 weight percent. It is to be kept in mind that the solubility of copolymers in organic liquids, such as hydrocarbons or halohydrocarbons, increases as the molecular weight of the α-olefin monomer increases, i.e., as the size of R increases.

Preferably, the molecular weight of the starting ethylene/propylene copolymer is such that the inherent viscosity of a solution of about 0.05 gram of copolymer in 100 ml. of carbon tetrachloride at 30°C. is about 0.3–3.5 deciliters/gram; especially, 1–3.5 deciliters/gram.

While the starting copolymers are substantially saturated, they may have some unsaturated chain ends. Depending on the polymerization conditions, if all chain transfer involves hydride loss, as high a proportion as one-half of the chain ends may be unsaturated. These terminal double bonds are capable of cleavage by ozonolysis with formation of carboxyl groups. When such a high proportion of terminal double bonds is present, less chain cleavage is necessary to provide a dicarboxylated product, and the molecular weight of the starting copolymer does not have to be very high. When there is, then, extensive chain transfer during the copolymerization (affecting about 30–50 percent of chain ends), the number average degree of polymerization of the starting copolymer should be about 25–35 times the number average degree of polymerization of the expected product having at least 1.98 carboxylic groups per fragment. If there is no chain transfer during the copolymerization, and the only source of carboxylic groups is chain cleavage, the molecular weight of the starting copolymer should be higher; the number average degree of polymerization of such copolymer being about 49.5 times the number average degree of polymerization of the expected product having at least 1.98 carboxylic groups per fragment. Since the liquid polymers of the present invention find utility in chain extension reactions by condensation with suitable difunctional compounds, it is, of course, desired to achieve a carboxyl functionality as close to 2 as possible. As the functionality decreases, the molecular weight of the resulting chain extended polymers decreases dramatically. Functionality of less than 1.8 is of no practical interest. When the carboxyl functionality exceeds 2, i.e., some carboxyl groups are present along the liquid polymer chain, cross-linked products are obtained by chain extension. Such cross-linking becomes excessive if the functionality of the liquid polymer is more than about 3.0. A practical upper limit of functionality is about 2.8.

The number average molecular weight of the starting polymer should be as high as possible. For ethylene/propylene copolymers, the minimum molecular weight is about 10,000; normally, the molecular weight will be about 50,000. For EPDM rubber, the number average molecular weight range is about 15,000–250,000; most frequently, it will be about 50,000–100,000, for example, in commercial rubbers. It is evident that the proportion of the diene compound in an EPDM rubber should not be so high that ozonolysis of the pendant double bonds would result in a high concentration of carboxyl groups, above the limits contemplated by this invention. For an ethylene/propylene/hexadiene rubber, the practical upper limit of hexadiene component is about 8.7 weight percent.

The starting copolymer is dissolved in a solvent which does not react with ozone at 25°C. A suitable solvent is, for example, carbon tetrachloride. The dissolution may be effected at any suitable temperature and at normal or superatmospheric pressure by any convenient method. While the process of this invention can be carried out either in dilute or in concentrated solution, it has been found that the most practical concentration of the copolymer is about 2–6 grams per 100 ml. of the solution. Higher concentrations give solutions that are too viscous for efficient dispersion and consumption of ozone.

The ozonization step requires a source of ozone. Most conveniently, ozone is prepared in situ using any suitable commercial generator. Suitable ozone generators are manufactured, for example, the Wellsbach Corporation, 2409 Westmoreland, Philadelphia, Pennsylvania. The ozone concentration in the stream of air leaving the generator can be determined by a known iodimetric method. A laboratory generator may produce, for example, 2 grams of ozone per hour. It is not recommended to either use pure ozone or to use ozone under high pressure because of the danger of explosion. The pressure of ozone should not exceed 7 kg/sq.cm. but should preferably be kept below about 2.5 kg/sq.cm. for greater safety.

The suitable temperature range is about 15°–50°C. Below the lower limit, virtually no reaction is observed. Above the upper limit, ozone does not dissolve well in the reaction medium; the efficiency of ozone utilization is thus reduced.

The ozonization reaction is quite rapid, but the length of time required for a given batch depends, among others, on the time required for the mass transfer of ozone from the gas phase to the liquid phase, the amount of the starting ethylene/α-olefin copolymer, and the desired number average molecular weight of the product. Normally, the reaction will be carried out for about 1–30 hours.

The reaction product can be recovered in any convenient manner. The most practical is the evaporation of solvent at a reduced pressure.

While the process of the present invention leads mainly to products having carboxyl group functionality, other functional groups may also be present in the products of the present invention. These groups will include, among others, ester, keto and hydroxyl groups. The determination of the number of functional groups per chain requires some knowledge of the molecular weight of the product. The molecular weight is preferably determined by vapor phase osmometry. The result is subject to various uncertainties, but the reliability of the method can be evaluated by comparison with results obtained for a polymer which does not contain polar groups. A good reference polymer is ethylene-propylene-nonconjugated diene copolymer, commonly designated EPDM polymer. The concentration of carboxyl groups in the product can then be determined by titration. Ozonization of a chain-saturated ethylene/propylene dipolymer according to the above process gives lower molecular weight products containing, on the average, about:

1.8–2.0 terminal carboxyl groups,

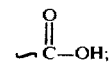

1.0–1.5 chain ester groups,

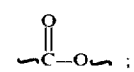

0.4–1.0 chain ketone groups, and

1.0–2.0 chain hydroxyl groups,

the wavy lines in the above representations designating polymer backbone.

The polymers of the present invention are useful starting materials for a number of higher polymers such as, for example, polyamides and polyesters.

This invention is now illustrated by examples of certain preferred embodiments thereof, wherein all parts, proportions, or percentages are by weight, unless indicated otherwise.

The inherent viscosity of polymer solutions was determined in Example 1 by measuring to ±0.1 sec. efflux times of 10 ml. of a solution of 0.05 ±0.001 gram of polymer in 100.0 ml. of carbon tetrachloride at 30°C. Replicate measurements were made in a Cannon-Fenske type viscometer until three consecutive efflux times agreed within 0.3 sec. An identical determination was made with the carbon tetrachloride solvent. The inherent viscosity was calculated as follows:

$$\eta_{inh} = \frac{\ln(\text{sample efflux time/solvent efflux time})}{\text{concentration of solution in g/100 ml.}}$$

EXAMPLE 1

A. Random Ethylene/Propylene Copolymer

The copolymer employed throughout all the Examples contains 47 weight percent ethylene and 53 weight percent propylene monomer units. Its Mooney viscosity (ML−1+4/121°C.) is 32.5 and its Wallace plasticity (at 100°C.) is 23.5. The viscosity-average molecular weight is about 115,000, which corresponds to a number-average molecular weight of about 29,000.

B. Ozonolysis Equipment

Ozone is generated by a Model T-23 Laboratory Ozonator supplied by the Ozone Process Division, the Wellsbach Corp., 2409 Westmoreland, Philadelphia, Pa. This apparatus will produce at least 2 grams of ozone an hour at a 1 percent concentration in clean, dry air (−60°F. dewpoint), when operated with 115-volt, 60-cycle current. The ozone concentration is varied by changing the voltage or by changing the flow of air through the apparatus. The ozone concentration present in the stream is determined by removing a small measured amount of ozonized gas and absorbing the ozone in neutral potassium iodide solution and titrating the liberated iodine.

C. Preparation of a Diacid by Ozonization of Ethylene/Propylene Copolymer

A 200-gram sample of the ethylene/propylene copolymer described in Part A is dissolved in 10 liters of carbon tetrachloride. The solution is treated with ozone for 25 hours at 25°C. in an agitated round-bottom glass flask. Ozone is introduced below the surface of the solution by means of a glass tube having a sintered glass tip. Gas leaves the flask through a pair of reflux condensers (joined in series) and thence through a trap containing aqueous potassium iodide. The Wellsbach Ozonator is set at 110 volts, 8 psig., and 0.02 cu. ft./min. (air flow) to generate about one gram of ozone every hour. During the treatment, 50-ml. samples are removed for measurement of inherent viscosity and molecular weight. The data which follow show the observed trend:

| Ozonolysis Time (hrs.) | Inherent Viscosity* | $\overline{M}n$** |
|---|---|---|
| 1 | 1.30 | 13,660 |
| 5 | 0.75 | 9,710 |
| 10 | 0.48 | 7,570 |
| 14 | 0.42 | 6,627 |
| 19 | 0.27 | 6,173 |
| 25 | 0.26 | 4,555 |

*Measured at 30°C. on a solution of 0.05 gram of copolymer in 100 ml. of CCl₄
**Number-average molecular weight as determined by Vapor Phase Osmometry The product is a low molecular weight linear liquid ethylene/propylene copolymer containing, on the average, a carboxyl group at each end of each polymer chain. It is isolated by evaporation of the solvent and drying at 70°C. (0.05 mm Hg.) for 10 hours.

When the above procedure is operated in a similar manner for 17.3 hours, the product is found to have an acid number of 17.1 (mg KOH/g.) and an $\overline{M}n$ of 6600, corresponding to a functionality of 2.015 $CO_2H$ groups/molecule. When $\overline{M}n$ is determined by vapor phase osmometry, a lower value (6370) results; the corresponding acid functionality is 1.94.

EXAMPLE 2

Chain Extension of Poly(ethylene/propylene) Diacid with Bis-Epoxides

The poly(ethylene/propylene) diacid employed has a number-average molecular weight of about 4,560. It is made by a procedure similar to that given in Example 1.

An 11.8 gram (0.00517 gram-mol) portion of the diacid and 0.764 gram (0.00517 gram-mol) of a polyepoxide (having a molecular weight of 387 by vapor phase osmometry; epoxide equivalent m.w., 142; and epoxide functionality of 2.75 groups per molecule) are contacted for two hours in 50 ml. of agitated, refluxing tetrahydrofuran containing five drops of dodecyl tetramethylguanidine. The chain-extended and partially crosslinked product thus formed is isolated by removal of solvent under nitrogen, first at 25°C. and 55°C. at atmospheric pressure, then at 60°–80°C. under vacuum. This product is a soft, flexible elastomer having the following excellent stress-strain properties at 25°C.; tensile strength, 11.5 kg./sq.cm.; extension at break, 650 percent; permanent set 4 percent.

I claim:

1. A process for preparing a liquid polymeric composition containing on the average about 1.8–3.0 carboxylic groups attached to a substantially saturated hydrocarbon backbone, said composition having a number average molecular weight of about 750–7,000, said process comprising the following sequential steps:
   1. dissolving in carbon tetrachloride a high molecular weight random copolymer selected from ethylene/propylene dipolymers and EPDM copolymers, the proportion of propylene in the copolymer being about 25–80 weight percent, and
   2. subjecting the solution resulting from step (1) above, to ozone at a temperature of about 15°–50°C. during a period of about 1–30 hours.

2. The process of claim 1 wherein the starting copolymer is an EPDM copolymer.

3. The process of claim 2 wherein the copolymer is an ethylene/propylene/hexadiene copolymer, the proportion of the hexadiene component being up to about 8.7 weight percent.

4. The process of claim 1 wherein the concentration of the starting copolymer is about 2–6 g per 100 ml of solution.

5. A polymeric composition prepared by the process of claim 1.

6. A polymeric composition of claim 5 having a number-average molecular weight of about 750-5,000.

7. A composition of claim 5 having 1.8-2.8 carboxylic groups per molecule.

8. A polymeric composition prepared by the process of claim 4.

9. The process of claim 1 where the starting copolymer is a dipolymer of ethylene and propylene having a number average molecular weight of at least about 10,000.

10. The process of claim 9 wherein the number average molecular weight of the starting copolymer is about 50,000.

11. The process of claim 9 wherein the proportion of the propylene component is 25–55 weight percent.

12. The process of claim 2 wherein the number average molecular weight range of the starting copolymer is 15,000–250,000.

13. The process of claim 12 wherein the number average molecular weight range of the starting copolymer is about 50,000–100,000.

* * * * *

UNITED STATES PATENT OFFICE
CERTIFICATE OF CORRECTION

PATENT NO. : 3,910,990
DATED : October 7, 1975
INVENTOR(S) : James Melvin Meyer

It is certified that error appears in the above-identified patent and that said Letters Patent are hereby corrected as shown below:

Column 2, line 8 after "side" insert -- chain --.

Column 3, line 48, after "example" insert -- by --.

Column 4, line 50, formula should be $$-\sim\underset{\underset{OH}{|}}{\overset{|}{C}}\sim-$$

Signed and Sealed this second Day of March 1976

[SEAL]

Attest:

RUTH C. MASON
*Attesting Officer*

C. MARSHALL DANN
*Commissioner of Patents and Trademarks*